Figure 6:
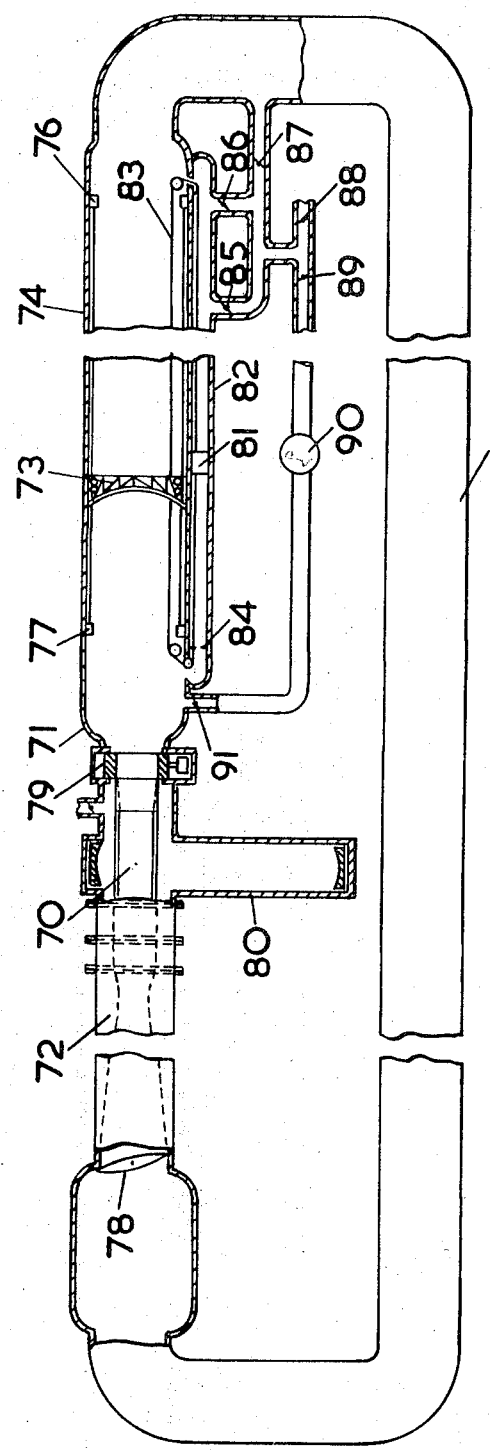

United States Patent [19]
Evans

[11] 3,782,189
[45] Jan. 1, 1974

[54] WIND TUNNEL
[75] Inventor: John Yorath Gwynne Evans, Farnham, England
[73] Assignee: National Research Development Corporation, London, England
[22] Filed: Apr. 12, 1972
[21] Appl. No.: 243,345

[52] U.S. Cl. .................................................. 73/147
[51] Int. Cl. ............................................ G01m 9/00
[58] Field of Search ....................................... 73/147

[56] References Cited
UNITED STATES PATENTS
3,109,305   11/1963   Kilmer ................................. 73/147
3,029,635   4/1962   Fetz ..................................... 73/147

Primary Examiner—S. Clement Swisher
Attorney—Cushman, Darby & Cushman

[57] ABSTRACT

A wind tunnel having a main piston in cylinder arrangement upstream of its working section, and driving means for driving the piston to force gas from the cylinder at the downstream side of the piston and through the working section.

The tunnel is capable of providing flow speeds up to Mach 3.

21 Claims, 6 Drawing Figures

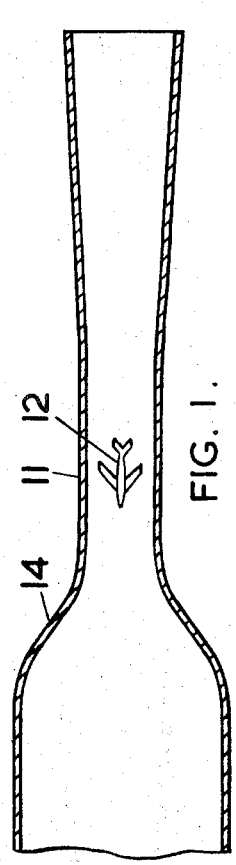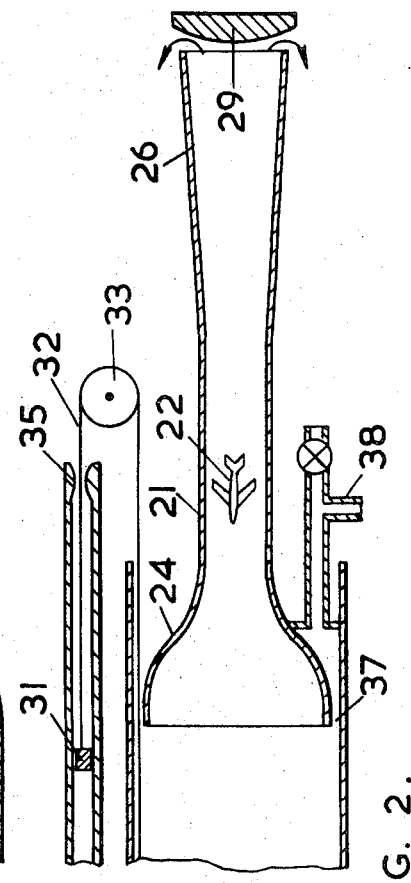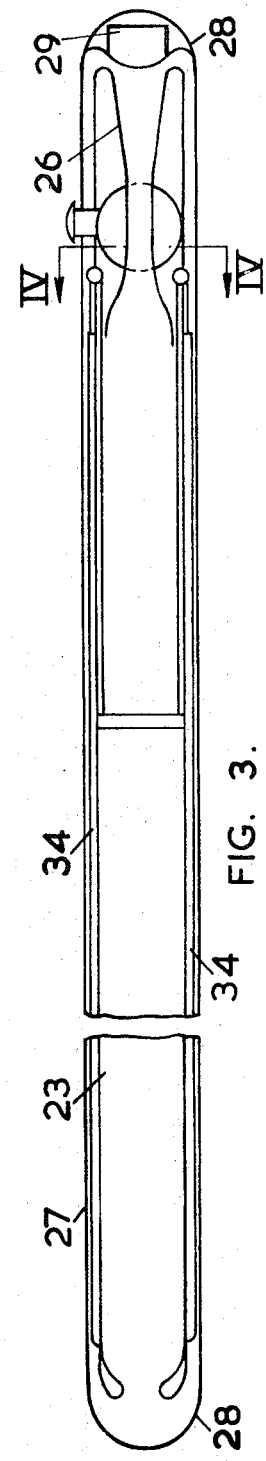

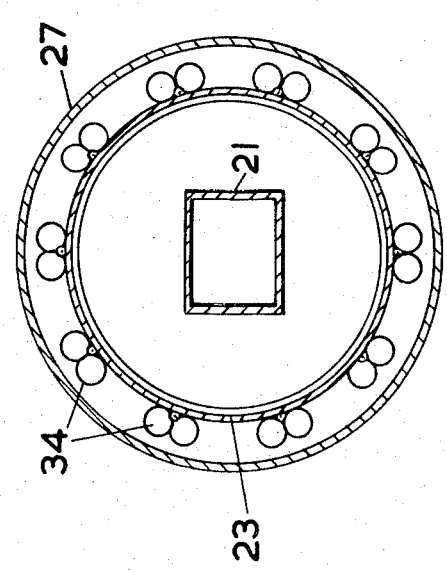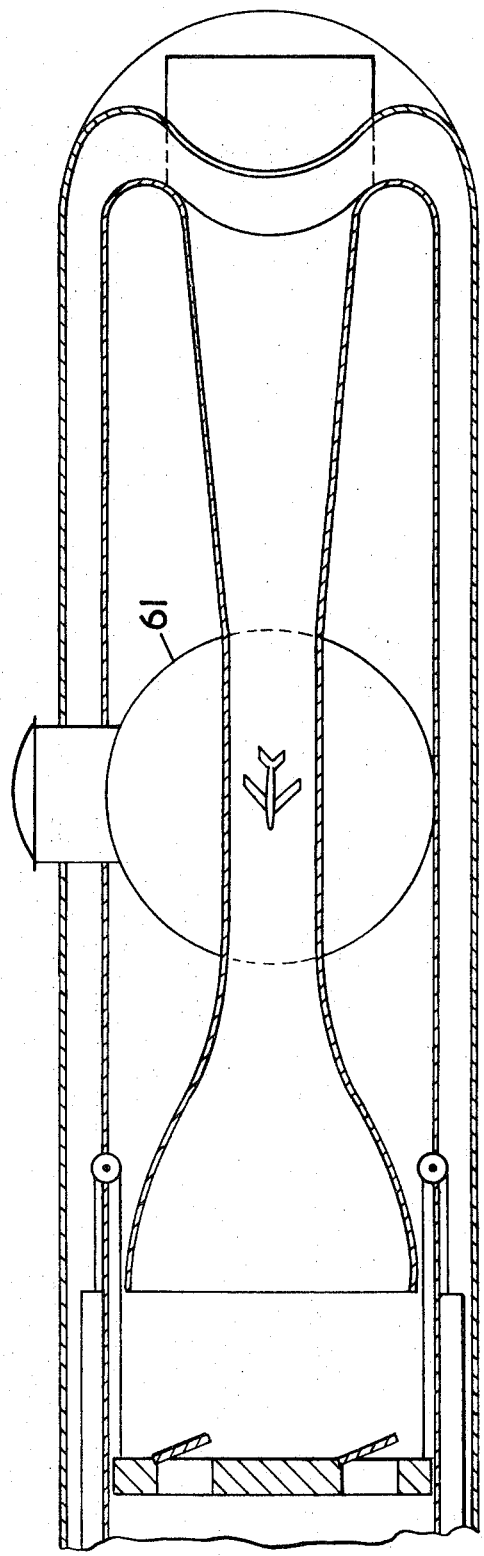
FIG. 4.
FIG. 5.

WIND TUNNEL

This invention relates to wind tunnels.

In one aspect the invention is concerned with the provision of a transonic wind tunnel which will enable aerodynamic research to be carried out in connection with aircraft capable of flight within the transonic range of about 0.6–1.3 Mach number.

It can be shown by calculation that a wind tunnel for this particular range of investigation should be able to achieve a Reynolds number based on a typical aircraft wing design of at least $40 \times 10^6$. The maximum practical working pressure is dictated by the model strength and stiffness and from this it can be shown that a good compromise solution is to have a working section of some 5 metres by 4.0–4.5 metres cross section which can be pressurized to 7 atmospheres with a working run of 10 seconds.

The energy in an air stream in a working section 5 metres by 4.2 metres driven at transonic speed at 7 atmospheres stagnation pressure is 2140 megawatts and a conventional fan driven wind tunnel of this size and capable of continuous operation would require over 500 megawatts to drive it. For reasons of costs this would generally be considered to be impracticable.

As an alternative to the conventional type of tunnel, a stored energy system may be considered. Using air stored at high pressure, intermittent 10 second runs could be achieved and the time between runs can be used to recharge the store. However, to enable the size of air storage vessels to be kept to acceptable limits, pressures of as high as 300 atmospheres may be necessary and this would lead to a major loss of energy in releasing this high pressure air through the tunnel to atmosphere. Also, the controlled release of air at high pressure is difficult to manage on such a major scale, if pressure and temperature changes are to be kept within acceptable tolerances and difficulty would also be expected in obtaining the desired standard of steady flow conditions. Furthermore, the noise accompanying such a discharge would cause severe environmental problems.

It is an object of the present invention to provide an improved wind tunnel in which there may be obtained a steady gas flow of low turbulence for a period of several seconds.

A wind tunnel capable of providing flow speeds not greater than Mach 3 according to the present invention has a main piston in cylinder arrangement upstream of the working section of the tunnel and means for driving the piston to force gas from the cylinder at the downstream side of the piston and through the working section.

In a preferred embodiment for providing transonic flow, sealing means are provided for sealing the tunnel downstream of the working section and a gas return circuit leads from the downstream side of the sealing means to the upstream side of the main piston and provision is made for pressurising the gas in the cylinder downstream of the main piston and within the working section to a pressure greater than that obtained downstream of the sealing means where it is also pressurised, the sealing means being operable to open to allow high pressure gas to flow through the working section of the tunnel to the return circuit due to gas expansion and movement of the main piston. Typical sealing means include plug and butterfly valves.

Convenient means for driving the main piston utilize the energy of the pressurised gas, and may include one or more secondary pistons across which a pressure difference is established and which are connected to drive the main piston. The initial accelerating impulse to the piston can be obtained by throttling the supply to the secondary pistons.

It may, however, be preferred to employ a separate initial accelerating means, such as a ram driven by a further supply of pressurized gas. The pressurized gas for the secondary piston may be obtained from the return circuit or from the initially highly pressurized regions.

The total secondary piston area need not be as great in the latter case as in the former. The latter case has however the disadvantage of permitting, unless the connection is choked, such perturbations as may arise from the secondary pistons to spread into the working section. A boundary layer bleed may advantageously be provided upstream of the working section and this can constitute the supply in the aformentioned latter case although the bleed generally only requires about 3 percent of the gas and the secondary piston may require about 15 percent. The bleed can, however, feed the secondary pistons even in the former case, although preferably through a choked nozzle. The space downstream of the secondary pistons may be at least partly evacuated. The secondary pistons may conveniently be connected to the main piston by cable means.

The means for raising the pressure of the gas in the cylinder downstream of the piston may also be used for resetting the piston at the end of a run. Clearly in a self contained system these means may be arranged to evacuate the said spaces and to pump gas from the return circuit into the region downstream of the main piston.

In a wind tunnel according to the invention and in which a contraction is provided between the main piston cylinder and the working section, acceleration of the main piston will probably cause a pressure wave to reverberate between the piston and the contraction walls, while opening of the sealing means will cause an expansion wave to travel upstream. These waves could cause perturbations in the working section which would have an adverse effect on the accuracy of the tunnel particularly during an initial part of the stroke of the piston but also throughout its travel. According to an important feature of the invention, timing means may be employed for so controlling the opening of the sealing means and the release of the main piston that the pressure wave and the expansion wave to a large extent cancel one another, and the said perturbations are rendered negligible.

The invention is illustrated by way of example in the diagrammatic drawings accompanying the provisional specification of which:

FIG. 1 is a schematic plan representation showing the basic features of the new design, FIG. 2 is a schematic plan view showing its application to a transonic pressurised wind tunnel, FIG. 3 is a general arrangement of a transonic pressurised wind tunnel of the kind shown at FIG. 2, FIG. 4 is a cross-sectional end view to larger scale on the line IV—IV of FIG. 3, and, FIG. 5 shows to larger scale the right hand end section of the tunnel of FIG. 3, and FIG. 6 which is a general arrangement of one alternative form of transonic pressurized wind tunnel.

Referring first to FIG. 1, the working section of a wind tunnel is indicated at 11 with a model 12 positioned therein. A cylinder 13 upstream of the working section 11 and joined to it by a contraction section 14 houses a main piston 15 which is movable as indicated by the arrow A. Movement of the piston 15 drives air through the working section 11.

Referring now to FIGS. 2, 3, 4 and 5, a pressurised transonic tunnel has a working section 21 housing a model 22. A cylinder 23 upstream of the working section 21 and joined to it by a contraction section 24 houses a main piston 25 which is movable as indicated by arrow B at FIG. 2. A diffuser section 26 leads from the working section 21 to a return circuit comprising an outer pressure vessel 27 and hemispherical end members 28. At the downstream end of the diffuser 26, sealing means in the form of a movable plug 29 is provided for sealing the diffuser. In the particular arrangement shown the working section 21 is 5 metres wide by 4.2 metres high, and the cylinder 23 is 14.6 metres diameter. With this contraction ratio of 8:1 the maximum speed of the piston to obtain sonic velocity at the working section is 24.4 metres/second.

Provision is made for pressurising the air in the cylinder 23, contraction section 24, working section 21 and diffuser 26 between the piston 25 and plug 29 to a pressure greater than that in the return circuit which is also pressurised as will later be described.

With the plug 29 in an open position, if the piston 25 were accelerated towards the working section 21, a pressure wave would travel down the cylinder 23 and be partially reflected from the contraction section 24, only to be reflected again from the piston 25, continuing in this manner until the pressure has built up progressively to the steady-state condition. This situation, which would result in much of the piston travel being wasted during the starting process, can be avoided by initiating the flow from the downstream end. If the plug 29 is controlled by timing means (not shown) to open, in this case over a period of about 0.33 seconds, it will allow air to escape into the lower-pressure region of the return circuit and an expansion wave will travel up the cylinder 23. If the piston 25 is started at the precise moment that this wave reaches the piston face, and the rate of opening of the plug is tailored to match the piston acceleration, then the expansion wave will be cancelled at the piston. In this way, a uniform flow can be maintained in the working section from the time the diffuser first becomes choked and before the piston has even started to move.

The feasibility of obtaining a good starting sequence in practice can be demonstrated by simple experiments, and it is possible to reduce pressure purturbation in the working section to less than about 0.25 percent.

The pressure ratio needed across the piston in order to drive the tunnel at transonic speeds ($0.6 < M < 1.3$) will be slightly less than that generated by a fan in a continuous circuit, since the conventional cooler and screens are absent. For design purposes, the pressure difference across the main piston has been 1/7 of the stagnation pressure, H, at the working section. Thus, when the working section of the tunnel is charged to its 7 atmos maximum, the pressure upstream of the main piston will be 6 atmos during the run and the total load on the piston is 17,000 Kilo Newtons; the power involved in moving it at 24.4 m/s is 420 megawatts.

The arrangement for driving the main piston is shown diagrammatically in FIGS. 2–5. Secondary driving pistons are provided, of which one is shown at 31, which are connected by cables 32 running over pulleys 33 to the main piston 25. The pistons 31 are housed in cylinders 34 and means are provided for producing a near vacuum pressure at the faces of the pistons 31 remote from the cables 32. The load produced on these pistons 31 is proportional to the pressure in the return circuit and hence to the stagnation pressure H. In this way, the pressure ratio across the main piston is determined by the geometry of the system and is independent of H.

A restriction 35 is built into the entry to the cylinder 34 of each driving piston 31, of a size such that the pressure at the cable-side face of each piston 31 falls progressively to about 90 percent of the initial level as the main piston picks up speed. Thus is provided the load needed to accelerate the main piston — a load which is slightly higher than the steady-state load. The piston dimensions are chosen so that the system is in balance during a run. Before the run, the main piston must be restrained mechanically because the cables 32 will be under tension and it is released at the instant that the expansion wave from the contraction section 14 reaches its face. When the piston 25 approaches the working section of the cylinder, a buffer system (not shown) operates to absorb the momentum of the whole mechanical system. Hinged flaps 36 in the main piston face can open automatically in order to allow the air to continue to flow around the circuit and to lose momentum at a more gradual rate. The mass of air in the circuit is at least an order of magnitude higher than the mass of the piston system, when the tunnel is at high pressure.

The tunnel is recharged between runs by closing the plug 29 at the diffuser exit and pumping air from the return circuit into the cylinder downstream of the piston 25. One way of getting the air in would be to make use, in reverse, of boundary layer suction slots 37 (about 2 percent of the cross-sectional area) at the start of the contraction 24 to which air is pumped from the return circuit through a connection 38.

The pressure ratio and power needed to pump the air is exactly that which would be required to drive a conventional transonic tunnel of closed circuit, but of a scale reduced by the ratio of running time to charging time selected for the big tunnel. If 5 minutes of a 15 minute interval between runs is allowed as a settling period after recharging, the ratio of times is 60:1 for a 10 second running time and the power input corresponds to that for a continuous tunnel with a test section area of 0.33m², i.e., about 8 MW. A conventional wind tunnel fan (of about 1m diameter) and cooler could be used for this purpose.

The driving-piston areas and power input quoted above are more than adequate for operating a tunnel which has solid walls to the test section, but some increases might be needed if ventilated walls of high porosity are used in conjunction with automatic suction from plenum chamber to diffuser. Even so, it is unlikely that the required power will exceed 11 MW.

In this typical arrangement the overall length of the cylinder 23 necessary to provide a running time of 10 seconds in the maximum mass flow case is 227m. If the whole circuit is contained within the cylindrical pressure vessel 27 with hemispherical ends 28 the, total length of this vessel would be about 300m. A general arrangement of the tunnel is shown in FIG. 3.

The vessel contains 670,000 kg of air when charged to 7 atmos. Consequently the stagnation pressure of a test cannot be changed quickly. In practice, the vessel would be discharged progressively during the course of a test programme, a number of runs being made at each pressure level. The working section may be contained within a separate pressure sphere 61 shown at FIG. 5 so that access can be gained by depressurising the sphere without reducing pressure in the main vessel.

In the example of FIGS. 2–5 particular emphasis is placed on the application of the invention to a transonic wind tunnel capable of achieving a Reynolds number of $40 \times 10^6$ in a working section of 5 metres by 4.2 metres which can be pressurised to 7 atmospheres and capable of giving a working time of 10 seconds.

The wind tunnel illustrated in FIG. 6 has a working section 70, a contraction 71 and diffuser 72, a main piston 73 and a main cylinder 74, and a return leg 75.

The piston 73 comprises a domed plate on a lightweight frame and rollers co-operating with rails in the cylinder. No special seal is provided between the piston and the cylinder as a small leakage can inhibit the setting up of undesirable vortices forward of the piston. Seal means 76 are however provided in respect of the initial position of the piston. Buffer stops 77 are provided at the terminus of the piston's run.

The sealing means downstream of the working section 70 are constituted by a butterfly valve 78. This has the advantage of not requiring a removable force to hold it closed while the working section is being pressurized. A plug valve 79 enables isolation of and access to the working section without complete depressurization. In this embodiment the return leg 75 is separate and not concentric with the working section portion. The working section has an associated schlieren system 80.

The secondary piston system has three secondary pistons 81 in associated cylinders 82, and cables 83 connecting the secondary pistons with the main piston 73. The mouths of the cylinders communicate with the pressurized portions of the tunnel to provide a boundary layer bleed upstream of the contraction 71. An iris throttle 84 has the functions of providing for an initial acceleration force to the main piston and of inhibiting the feedback of secondary piston pressure perturbations from entering into the working section. Two inlets are provided approaching the secondary piston rim terminus end of each cylinder 82, each containing a throttle valve 85 and 86, respectively, via which they communicate through a valve 87 to the return leg 75, through a valve 88 to atmosphere, and through a valve 89 to pump means 90. The pump means 90 also communicates through a valve 91 directly with the tunnel just upstream of the contraction 71.

Restraining means, not shown, hold the main piston 73 in its initial position, and timing means (not shown) control the opening of the valve 78 and the release of the piston 73. The tunnel is, as shown, a closed system which does not require considerable replenishment with gas and the consequent cleaning and drying thereof.

The operation of this tunnel is as follows. With the main piston 73 restrained in the initial position, valves 78 and 88 closed and 85, 86, 87, 89 and 91 open, the pump means 90 commences to evacuate the cylinders 82, and the return leg 75, transferring the gas into the region between the piston 73 and the valve 78. When the desired drop in pressure in the return leg has been achieved, the valve 87 is closed and evacuation continues until the desired pressure drop is achieved in the cylinders 82. The valves 85 and 86 are then closed and any necessary new clean dry gas is obtained from atmosphere and pumped into the high pressure region until the desired pressure is reached. The valves 89 and 91 are then closed.

A run of the tunnel commences by operation of the timing means to open the valve 78 in a predetermined manner. At precisely the moment when the expansion wave caused by opening the valve reaches the piston 73 the latter is released. The secondary pistons 81 pulls the main piston 73 along the cylinder 74 taking air, including boundary layer, from the tunnel just upstream of the contraction 71.

The valves 85 and 86 are opened when the secondary pistons 81 are between their associated inlets, to equalise the pressure on each side of the piston and remove the force from the main piston, and the valve 78 is closed soon after. A cushion of air is thus built up ahead of the piston 73 which will stop it before it reaches the buffer.

It will be understood that the invention is not limited to these particular arrangements and that the general principle of using the movement of the piston in a cylinder to provide the necessary several seconds flow of gas, generally air, in the working section of a wind tunnel can be applied broadly to the design of wind tunnels.

It will be noted that particular advantages of the present wind tunnel arrangement are that the energy wastage is kept to an acceptable level, noise levels will be low and a clean and steady gas flow will be provided.

I claim:

1. A wind tunnel capable of providing flow speeds up to Mach 3 and having:
    a working section, a main piston in cylinder arrangement upstream of the working section, driving means for driving said piston to force gas from said cylinder and through said working section, operable sealing means sealing said tunnel downstream of said working section, and timing means for controlling the operation of the sealing means and the main piston wherein when the expansion wave caused by the opening of said sealing means reaches the main piston, movement of the main piston is initiated.

2. A wind tunnel as claimed in claim 1 and having a gas return circuit communicating between downstream of said sealing means and upstream of said main piston.

3. A wind tunnel as claimed in claim 1 and having pressurising means for pressurising the gas within the space upstream of the sealing means and downstream of the main piston.

4. A wind tunnel as claimed in claim 2 and having pressurising means transferring gas from said return circuit to, and pressurising, said space upstream of said sealing means and downstream of said main piston.

5. A wind tunnel as claimed in claim 3 and having isolating means permitting isolation of said working section from the greater part of the space upstream of said sealing means and downstream of said main piston.

6. A wind tunnel as claimed in claim 1 and wherein the driving means comprises at least one secondary piston in cylinder arrangement connected to said main piston.

7. A wind tunnel as claimed in claim 6 and having a cable connecting said at least one secondary piston with said main piston.

8. A wind tunnel as claimed in claim 6 and wherein said at least one secondary cylinder is adapted to be at least partially evacuated.

9. A wind tunnel as claimed in claim 3, wherein said driving means comprise at least one secondary piston in cylinder arrangement, and wherein said pressurising means is adapted to transfer gas to said working section from said at least one secondary cylinder downstream of its piston.

10. A wind tunnel as claimed in claim 8 and wherein said at least one secondary cylinder communicates upstream of its piston with the interior of said tunnel.

11. A wind tunnel as claimed in claim 1 and having a boundary layer bleed upstream of said working section.

12. A wind tunnel as claimed in claim 8, and having a boundary layer bleed upstream of said working section comprising communicating means communicating said at least one secondary cylinder upstream of its piston with the interior of said tunnel upstream of said working section and downstream of the main piston in cylinder arrangement.

13. A wind tunnel as claimed in claim 12 and having a choked nozzle in said communicating means.

14. A wind tunnel as claimed in claim 1 and having initiation means for initiating a starting impulse to said main piston.

15. A wind tunnel as claimed in claim 14 and wherein said initiation means comprises a ram.

16. A wind tunnel as claimed in claim 6 and having initiation means comprising a restriction in the mouth of said at least one secondary cylinder.

17. A wind tunnel as claimed in claim 1 wherein the timing means controls the rate of opening of the sealing means.

18. A wind tunnel as claimed in claim 1 having a contraction between said main piston in the cylinder arrangement and said working section.

19. A wind tunnel capable of providing flow speed up to Mach 3 and having a working section, a main piston in the cylinder arrangement upstream of the working section, a contraction between said piston in cylinder arrangement and said working section, at least one secondary piston in cylinder arrangement connected for driving said main piston, the downstream end of said at least one secondary cylinder being adapted to be at least partially evacuated, and the upstream end thereof communicating via a choked nozzle with the interior of the tunnel just upstream of the contraction, openable sealing means sealing said tunnel downstream of said working section, timing means controlling the opening of the sealing means and the initiation of movement of the main piston, a gas return circuit communicating between downstream of said sealing means and upstream of said main piston, and pressurizing means for transferring gas from said return circuit and from the downstream end of said at least one secondary cylinder to, and pressurizing, the space upstream of the sealing means and downstream of the main piston.

20. A wind tunnel as claimed in claim 19 wherein the openable sealing means is a butterfly valve.

21. A wind tunnel as claimed in claim 19 wherein the timing means controls the rate of opening of the openable sealing means.

* * * * *